Patented Sept. 28, 1937

2,094,297

UNITED STATES PATENT OFFICE 2,094,297

MANUFACTURE OF CONDENSATION PRODUCTS FROM ALIPHATIC ORGANIC COMPOUNDS

Walter Philip Joshua, London, and Herbert Muggleton Stanley, Great Bookham, England, and Otto Fuchs and Wilhelm Querfurth, Constance, Baden, Germany, and John Blair Dymock, Cheam, England, assignors to Deutsche Gold- und Silber Scheideanstalt vormals Roessler, Frankfort-on-the-Main, Germany No Drawing. Application October 26, 1932, Serial No. 639,734. In Great Britain October 26, 1931

13 Claims. (Cl. 260—106)

The present invention relates to the manufacture of valuable condensation products from the oxygenated derivatives of the paraffin series of hydrocarbons and specifically relates to the production of alcohols, esters and other valuable derivatives of higher molecular weight from aldehydes such as acetaldehyde, also from alcohols such as methyl alcohol, ethyl alcohol or propyl alcohol, and from esters of the aforementioned alcohols such as ethyl acetate by catalytic treatment in the presence of hydrogen.

In so far as the use of alcohols as initial material is concerned it has already been proposed to convert such alcohols into higher alcohols and other valuable products by the use of a catalyst consisting of a metal oxide having a dehydrating effect such as alumina in conjunction with a metal such as copper or silver known to have a hydrogenating action.

In carrying out the manufacture according to the present invention we use catalysts which consist of a difficultly reducible oxide or mixture of oxides having only feeble or no basic action and being stable at the prevailing temperature, together with a metal or mixture of metals known to have a hydrogenating or dehydrogenating action and not exceeding in quantity ten per cent by weight of the complete catalyst. The metal or metals may be taken in their metallic state and be admixed as such or the oxide or oxides may be used, it being understood that owing to the use of hydrogen as hereinbefore mentioned and as hereinafter described the oxide or oxides will rapidly be reduced. We may also use, as an addition in the catalyst, oxides having a basic reaction, but we prefer to limit the amount of these basic oxides so that the proportion present is always less than the proportion of the other catalytic constituents, particularly when lower alcohols such as methyl and ethyl alcohols are used as starting material. We have found, however, that when the materials to be treated contain a substantial proportion of a higher alcohol such for example as butyl alcohol, as would be the case for instance when re-treating part of the products from the treatment of a lower alcohol, it is preferable to employ a catalyst containing larger amounts of the basic oxide. The catalyst may be used on carriers, such as pumice or other inert material.

According to the present invention it is essential that hydrogen should be added to the reaction mixture as it has been found that improved technical results are obtained by this addition; and, moreover, the addition of hydrogen increases the activity and the life of the catalyst. Suitable amounts of hydrogen are from one half mol. hydrogen to three or more mols hydrogen for each mol. of aliphatic compound.

The conversion can be carried out at temperatures between 150 and 400° C. and increased pressure may be used although we prefer to use atmospheric pressure except when treating reaction mixtures containing appreciable amounts of a higher alcohol such as butyl alcohol in which case the use of moderate pressures up to fifty atmospheres is advantageous.

As examples of the metal oxides of feeble basic action which can be used may be mentioned alumina, uranium oxide, thoria and so forth, and as catalytic metals can be mentioned copper, nickel, silver, chromium and cobalt. Suitable oxides having a basic reaction are calcium oxide, barium oxide, strontium oxide, magnesia and lithia. By the passage of a mixture of acetaldehyde and hydrogen, for instance, over a catalyst consisting of alumina and copper, there may be obtained considerable quantities of higher esters and higher alcohols, and substantially the whole of the acetaldehyde unconverted into the aforesaid higher products is recovered without decomposition.

We have also found that by altering the proportions of metal oxide and catalytic metal in the catalyst, the course of the reaction can be influenced so that either higher yields of alcohols and the like can be produced, or the conversion can be directed towards the production of larger proportions of esters and so forth. It is essential, however, that the proportion of catalytic metal should not exceed ten per cent by weight of the total catalyst.

After the catalytic conversion the products of the reaction may be condensed and separated, or partially condensed and recirculated over the catalyst. The unconverted starting material may be recirculated over the catalyst alone or together with any of the products of the reaction.

The following are examples of the manner in which the invention may be carried into effect and the results obtained:—

Example I

The catalyst employed contained in an electrically heated tube of any suitable material such as aluminium was composed as follows:—

| | Parts by weight |
|---|---|
| Alumina | 100 |
| Calcium oxide | 6 |
| Copper | 1.5 |

A mixture of acetaldehyde and hydrogen in the proportion of 1 mol. acetaldehyde to 1.5 mol. hydrogen was passed over the catalyst at a rate of 40 litres per hour (calculated as hydrogen) per litre of catalyst at atmospheric pressure and a temperature of 260° C.

The condensation products obtained (in addition to unchanged acetaldehyde and hydrogen and a small amount of ethyl alcohol) were as follows:—

| | Parts by weight |
|---|---|
| Butyl acetate | 9.3 |
| Butyl butyrate | 11.5 |
| Butyl alcohol | 20.2 |
| Alcohols higher than butyl alcohol | 10.5 |

Example II

The catalyst was composed as follows:—

| | Parts by weight |
|---|---|
| Alumina | 100 |
| Barium oxide | 6 |
| Copper | 1.5 |

The treatment being the same as in Example 1, the condensation products were as follows:—

| | Parts by weight |
|---|---|
| Butyl acetate | 5.6 |
| Butyl butyrate | 5.3 |
| Butyl alcohol | 15.5 |
| Alcohols higher than butyl alcohol | 8.3 |

Example III

The catalyst was composed as follows:—

| | Parts by weight |
|---|---|
| Alumina | 100 |
| Magnesium oxide | 6 |
| Copper | 1.5 |

The treatment being the same as in Examples I and II the condensation products were as follows:—

| | Parts by weight |
|---|---|
| Butyl acetate | 6.6 |
| Butyl butyrate | 8.6 |
| Butyl alcohol | 17.9 |
| Alcohols higher than butyl alcohol | 10.5 |

Example IV

The catalyst was composed as follows:—

| | Parts by weight |
|---|---|
| Alumina | 100 |
| Calcium oxide | 6 |
| Copper | 2 |

A mixture of ethyl alcohol and hydrogen in the proportion of 1 mol. ethyl alcohol to 2 mols hydrogen was passed over the catalyst at the same rate, temperature and pressure as in Examples I, II, and III.

The condensation products obtained were as follows:—

| | Parts by weight |
|---|---|
| Butyl acetate | 12.7 |
| Butyl butyrate | 3.0 |
| Butyl alcohol | 14.0 |
| Alcohols higher than butyl alcohol | 6.0 |

Example V

The catalyst employed was composed as follows:—

| | Parts by weight |
|---|---|
| Magnesium oxide | 89 |
| Alumina | 8 |
| Copper oxide | 3 |

It is to be observed that the amount of basic oxide is considerably greater in this example than in the previous example; this is because we are here treating a mixture of alcohols including a higher alcohol as hereinbefore mentioned. Actually the mixture consisted of methyl alcohol, butyl alcohol and hydrogen in the proportion of 4.6 mols methyl alcohol, 2 mols butyl alcohol and 2 mols hydrogen. This mixture was passed over the catalyst at a pressure of about 30 atmospheres and a temperature of 350° C.

The condensation products obtained (in addition to unchanged components and small amounts of acetaldehyde, butyraldehyde and esters of formic acid) were as follows:—

| | Parts by weight |
|---|---|
| Amyl alcohol | 1078 |
| Hexyl alcohol | 82 |
| Alcohols of higher boiling point especially heptyl alcohol | 480 |

This example shows that by using a mixture of alcohols including a higher alcohol together with methyl alcohol, the higher alcohols with a boiling point of over 120° C. can be obtained in considerable quantities. It is for example possible to take the mixed products resulting from any initial conversion of a lower alcohol into a higher alcohol and re-treat it according to the present invention for the further conversion into higher alcohols. Similarly it is possible to take the mixed product of any initial conversion of a lower alcohol into a higher alcohol or to take either component of such a product and to mix it with a fresh quantity of an alcohol and subject that mixture to treatment according to the present invention.

Example VI

Using the same catalyst as in Example V a mixture of ethyl alcohol, butyl alcohol and hydrogen in the proportion of 1 mol. ethyl alcohol, 0.6 mol. butyl alcohol and 1.5 mol. hydrogen was treated at 258° C. at atmospheric pressure.

The condensation products obtained were as follows:—

| | Parts by weight |
|---|---|
| Hexyl alcohol (both normal hexyl alcohol and diethyl carbincarbinol) | 50.5 |
| Octyl alcohol | 16.1 |
| Higher boiling point alcohols including decyl alcohol, and ethers of higher alcohols | 20.0 |

Example VII

Using the same catalyst as in Examples V and VI but a temperature of 320° C. and a pressure of 30 atmospheres the mixture treated was in the proportion of 3 mols ethyl alcohol, 1.8 mols butyl alcohol and 2 mols hydrogen.

The condensation products obtained were as follows:—

| | Parts by weight |
|---|---|
| Hexyl alcohol | 336 |
| Octyl alcohol | 47 |
| Higher boiling point alcohols including decyl alcohol and ethers of higher alcohols | 318 |

This example shows the advantage of using a moderate super-atmospheric pressure when treating mixed alcohols.

Wherever the use of elevated pressure is not expressly set forth, the examples were carried out by passing the vapors in admixture with hydrogen at atmospheric pressure. By the term "oxygenated derivative of hydrocarbons of the paraffin series" used in the following claims, we mean alcohols, aldehydes and aliphatic esters.

What we claim is:—

1. The process of producing valuable condensation products from the lower aliphatic monohydric alcohol esters of the lower fatty acids comprising subjecting said esters in conjunction with hydrogen to the action of a mixed catalyst, comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with an alkali earth metal oxide and the reaction temperature ranging from about 150° C. to about 450° C.

2. The process of producing valuable condensation products from the lower aliphatic monohydric alcohol esters of the lower fatty acids comprising subjecting said esters in conjunction with hydrogen to the action of a mixed catalyst, comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia and the reaction temperature ranging from about 150° C. to about 450° C.

3. The process of producing valuable condensation products from the lower aliphatic monohydric alcohol esters of the lower fatty acids comprising subjecting said esters in conjunction with hydrogen to the action of a mixed catalyst, comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with barium oxide and the reaction temperature ranging from about 150° C. to about 450° C.

4. The process of producing valuable condensation products from the lower aliphatic monohydric alcohol esters of the lower fatty acids comprising subjecting said esters in conjunction with hydrogen to the action of a mixed catalyst, comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with calcium oxide and the reaction temperature ranging from about 150° C. to about 450° C.

5. The process of producing valuable condensation products from the lower aliphatic monohydric alcohol esters of the lower fatty acids comprising subjecting said esters in conjunction with hydrogen to the action of a mixed catalyst, comprising essentially a dehydrating metal oxide which will be stable in the reaction in admixture with a hydrogenating metal not exceeding in quantity 10% by weight of the complete catalyst and an alkali earth metal oxide the reaction temperature ranging from about 150° C. to about 450° C.

6. The process of producing valuable condensation products from the lower aliphatic monohydric alcohol esters of the lower fatty acids comprising subjecting said esters in conjunction with hydrogen to the action of a mixed catalyst, comprising essentially a dehydrating metal oxide which will be stable in the reaction in admixture with a hydrogenating metal oxide not exceeding in quantity 10% by weight of the complete catalyst and an alkali earth metal oxide the reaction temperature ranging from about 150° C. to about 450° C.

7. The process of producing valuable condensation products from the lower aliphatic monohydric alcohol esters of the lower fatty acids comprising subjecting said esters in conjunction with hydrogen to the action of a mixed catalyst, comprising essentially a dehydrating metal oxide which will be stable in the reaction with a hydrogenating metal not exceeding in quantity 10% by weight of the complete catalyst and with magnesia the reaction temperature ranging from about 150° C. to about 450° C.

8. The process of producing valuable condensation products from the lower aliphatic monohydric alcohol esters of the lower fatty acids comprising subjecting said esters in conjunction with hydrogen to the action of a mixed catalyst, comprising essentially a dehydrating metal oxide which will be stable in the reaction with a hydrogenating metal oxide not exceeding in quantity 10% by weight of the complete catalyst and with magnesia, the reaction temperature ranging from about 150° C. to about 450° C.

9. The process of producing valuable condensation products from the lower aliphatic monohydric alcohol esters of the lower fatty acids comprising subjecting said esters in conjunction with hydrogen to the action of a mixed catalyst, comprising essentially a dehydrating metal oxide which will be stable in the reaction with a hydrogenating metal not exceeding in quantity 10% by weight of the complete catalyst and with barium oxide, the reaction temperature ranging from about 150° C. to about 450° C.

10. The process of producing valuable condensation products from ethyl acetate comprising subjecting said ethyl acetate in conjunction with hydrogen to the action of a mixed catalyst comprising essentially a compound taken from a group consisting of alumina, uranium oxide, thoria, beryllium oxide and zirconium oxide in admixture with a substance taken from a group consisting of copper, nickel, silver, chromium, cadmium, zinc, tin, manganese and cobalt and the oxides thereof, said substance not exceeding in quantity 10% by weight of the complete catalyst and in admixture with magnesia and the reaction temperature ranging from about 150° C. to about 450° C.

11. The process of producing valuable condensation products from ethyl acetate comprising subjecting said ethyl acetate in conjunction with hydrogen to the action of a mixed catalyst comprising essentially a dehydrating metal oxide which will be stable in the reaction in admixture with a hydrogenating metal oxide not exceeding in quantity 10% by weight of the complete catalyst and an alkali earth metal oxide, the reaction temperature ranging from about 150° C. to about 450° C.

12. The process of producing valuable condensation products from ethyl acetate comprising subjecting said ethyl acetate in conjunction with hydrogen to the action of a mixed catalyst, comprising essentially a dehydrating metal oxide which will be stable in the reaction in admixture with a hydrogenating metal not exceeding in quantity 10% by weight of the complete catalyst and an alkali earth metal oxide, the reaction temperature ranging from about 150° C. to about 450° C.

13. The process of producing valuable condensation products from ethyl acetate comprising subjecting said ethyl acetate in conjunction with hydrogen to the action of a mixed catalyst, comprising essentially a dehydrating metal oxide which will be stable in the reaction with a hydrogenating metal not exceeding in quantity 10% by weight of the complete catalyst and with magnesia, the reaction temperature ranging from about 150° C. to about 450° C.

WALTER PHILIP JOSHUA.
HERBERT M. STANLEY.
OTTO FUCHS.
WILHELM QUERFURTH.
JOHN BLAIR DYMOCK.